US010486514B2

(12) United States Patent
Takayanagi et al.

(10) Patent No.: US 10,486,514 B2
(45) Date of Patent: Nov. 26, 2019

(54) VEHICLE WITH DISTRIBUTED DRIVE AND POWER COMPONENTS

(71) Applicant: HONDA MOTOR CO., LTD., Tokyo (JP)

(72) Inventors: Taku Takayanagi, Saitama (JP); Hiroyoshi Suzuki, Saitama (JP); Masanori Hayashi, Saitama (JP); Naoki Hashirayama, Saitama (JP); Yuichiro Saneyoshi, Saitama (JP); Junichi Ogino, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/747,908

(22) PCT Filed: Jul. 27, 2015

(86) PCT No.: PCT/JP2015/071242
§ 371 (c)(1),
(2) Date: Jan. 26, 2018

(87) PCT Pub. No.: WO2017/017762
PCT Pub. Date: Feb. 2, 2017

(65) Prior Publication Data
US 2018/0244142 A1    Aug. 30, 2018

(51) Int. Cl.
*B60K 1/04* (2019.01)
*B60K 1/00* (2006.01)
(Continued)

(52) U.S. Cl.
CPC .............. *B60K 1/04* (2013.01); *B60K 1/00* (2013.01); *B60K 5/00* (2013.01); *B60K 6/40* (2013.01);
(Continued)

(58) Field of Classification Search
CPC .............. B60K 1/04; B60K 2001/0422; B60K 2001/0433; B60K 2001/0438; B60K 6/40;
(Continued)

(56) References Cited

U.S. PATENT DOCUMENTS 7,086,492 B2 *  8/2006  Kawasaki ................ B60K 1/04
                                                   180/274
2005/0139402 A1   6/2005  Yamashita
(Continued)

FOREIGN PATENT DOCUMENTS

JP    2006-151130 A    6/2006
JP    2009-029159 A    2/2009
(Continued)

OTHER PUBLICATIONS

Oct. 6, 2015, International Search Report issued for related international application No. PCT/JP2015/071242.
(Continued)

*Primary Examiner* — Frank B Vanaman
(74) *Attorney, Agent, or Firm* — Paratus Law Group, PLLC

(57) ABSTRACT

A vehicle includes: a vehicle interior; a front room provided on a front side of the vehicle interior; a luggage room provided in a rear side of the vehicle interior; a weight part which includes at least one of a drive unit to drive a vehicle wheel and a power source to supply fuel or power to the drive unit; and a battery. The weight part includes a first weight part and a second weight part, at least one of the first weight part and the second weight part includes the drive unit, the battery is provided below the vehicle interior, the first weight part is provided in the front room, the second weight part is provided below the luggage room, and a height of the second weight part is lower than a height of the first weight part.

14 Claims, 7 Drawing Sheets

(51) Int. Cl.
*B60K 5/00* (2006.01)
*B60K 6/40* (2007.10)
*B60K 15/063* (2006.01)
*B60L 15/00* (2006.01)
*B62D 21/02* (2006.01)
*B62D 25/08* (2006.01)
*H01M 2/10* (2006.01)
*H01M 8/04082* (2016.01)
*B60L 50/50* (2019.01)
*B60L 50/60* (2019.01)
*B60L 50/72* (2019.01)
*B62D 21/07* (2006.01)
*B60K 6/28* (2007.10)

(52) U.S. Cl.
CPC .......... *B60K 15/063* (2013.01); *B60L 15/007* (2013.01); *B60L 50/50* (2019.02); *B60L 50/66* (2019.02); *B60L 50/72* (2019.02); *B62D 21/02* (2013.01); *B62D 21/07* (2013.01); *B62D 25/082* (2013.01); *B62D 25/087* (2013.01); *H01M 2/1077* (2013.01); *H01M 2/1083* (2013.01); *H01M 8/04201* (2013.01); *B60K 6/28* (2013.01); *B60K 2001/001* (2013.01); *B60K 2001/0422* (2013.01); *B60K 2001/0433* (2013.01); *B60K 2001/0438* (2013.01); *B60K 2001/0472* (2013.01); *B60K 2015/0633* (2013.01); *B60K 2015/0634* (2013.01); *B60K 2015/0638* (2013.01); *B60Y 2400/202* (2013.01); *H01M 2220/20* (2013.01); *H01M 2250/20* (2013.01); *Y02T 10/6295* (2013.01); *Y02T 10/7005* (2013.01); *Y02T 90/34* (2013.01); *Y10S 903/907* (2013.01); *Y10S 903/951* (2013.01)

(58) Field of Classification Search
CPC .............. B60L 11/1809; B60L 11/1877; B60L 11/1879
See application file for complete search history.

(56) References Cited

U.S. PATENT DOCUMENTS

| | | | |
|---|---|---|---|
| 2006/0113128 A1 | 6/2006 | Sato et al. | |
| 2009/0152034 A1* | 6/2009 | Takasaki | B60K 1/04 180/68.5 |
| 2010/0101881 A1 | 4/2010 | Yoda et al. | |
| 2011/0068606 A1* | 3/2011 | Klimek | B60K 1/04 296/187.08 |
| 2011/0297469 A1* | 12/2011 | Usami | B60K 1/04 180/68.5 |
| 2011/0300426 A1 | 12/2011 | Iwasa et al. | |
| 2011/0300427 A1 | 12/2011 | Iwasa et al. | |
| 2013/0112491 A1 | 5/2013 | Suzuki et al. | |
| 2013/0248267 A1* | 9/2013 | Nitawaki | B60K 1/04 180/68.5 |
| 2016/0075224 A1* | 3/2016 | Miu | B60K 1/04 180/65.25 |
| 2016/0355100 A1* | 12/2016 | Ito | B60L 11/1877 |
| 2018/0244142 A1* | 8/2018 | Takayanagi | H01M 2/1077 |

FOREIGN PATENT DOCUMENTS

| | | |
|---|---|---|
| JP | 2010-119267 A | 5/2010 |
| JP | 2011-235830 A | 11/2011 |
| JP | 5104997 B2 | 12/2012 |
| JP | 2013-060195 A | 4/2013 |
| JP | 2013-252797 A | 12/2013 |
| JP | 2014-051210 A | 3/2014 |
| JP | 2014-151805 A | 8/2014 |
| WO | WO 2004/020237 A1 | 3/2004 |
| WO | WO 2012/017935 A1 | 2/2012 |

OTHER PUBLICATIONS

Oct. 6, 2015, International Search Opinion issued for related international application No. PCT/JP2015/071242.
Oct. 11, 2019, Chinese Office Action issued for related CN Application No. 201580081764.0.

* cited by examiner

VEHICLE WITH DISTRIBUTED DRIVE AND POWER COMPONENTS

CROSS REFERENCE TO RELATED APPLICATION

This application is a National Stage Patent Application of PCT International Patent Application No. PCT/JP2015/071242 (filed on Jul. 27, 2015) under 35 U.S.C. § 371, which is hereby incorporated by reference in its entirety.

TECHNICAL FIELD

The present invention relates to a vehicle such as a fuel cell vehicle, a hybrid vehicle, and an electric vehicle.

BACKGROUND ART

In the related art, there is known a vehicle in which a battery is mounted on the lower side of a floor panel thereof. For example, in a vehicle disclosed in Patent Literature 1, the battery is disposed below a vehicle interior, and an electric motor, an inverter, and a charger are disposed in a front room which is provided on the front side of the vehicle interior.

In addition, in a vehicle disclosed in Patent Literature 2, a fuel cell and one of two hydrogen tanks are disposed below the vehicle interior, the electric motor is disposed in the front room which is provided on the front side of the vehicle interior, the other one of the two hydrogen tanks is disposed on the lower side of a luggage room which is provided on the rear side of a seat, and a capacitor is disposed in the luggage room.

PRIOR ART LITERATURE

Patent Literature

Patent Literature 1: Japanese Patent No. 5104997
Patent Literature 2: JP-A-2006-151130

SUMMARY OF THE INVENTION

Problem that the Invention is to Solve

In the vehicle disclosed in Patent Literature 1, heavy components such as the electric motor and the battery are not disposed on the lower side of the luggage room. Therefore, there is an advantage that wide space can be secured in the luggage room. However, since the heavy components of the electric motor, the inverter, and the charger are disposed in the front room on the front side for the heavy component (that is, the battery) below the vehicle interior, a weight balance of the vehicle is worsened and there is room for improvement in agility of the vehicle.

On the other hand, in the vehicle disclosed in Patent Literature 2, the electric motor is disposed in the front room on the front side, and the capacitor, the hydrogen tank, and the heavy components are disposed in a distributed manner in the upper and lower part of the luggage room for the fuel cell below and the like (heavy component) the vehicle interior, so that the weight balance of the vehicle is good. However, since the capacitor is disposed in the luggage room, the luggage room is narrow.

The present invention has been made in view of the problems described above, and an object thereof is to provide a vehicle which is able to secure space in the luggage room while achieving the weight balance of the vehicle.

Means for Solving the Problem

In order to achieve the object, the invention provides the following aspects. According to a first aspect, there is provided a vehicle (e.g., a vehicle V in an embodiment to be described below) which includes a vehicle interior (e.g., a vehicle interior IN in the embodiment) in which a seat is provided;

a front room (e.g., a front room FR in the embodiment) which is provided as a separate space from the vehicle interior on a front side of the vehicle interior;

a luggage room (e.g., a luggage room LR in the embodiment) which is provided as a same space as the vehicle interior or a separate space from the vehicle interior in a rear side of the vehicle interior;

a weight part (e.g., a first weight part W1, a second weight part W2 in the embodiment) which includes at least one of a drive unit to drive a vehicle wheel (e.g., the front wheel FW in the embodiment) and a power source to supply fuel or power to the drive unit; and a battery (e.g., a battery unit 10 in the embodiment) which supplies power to the drive unit, wherein the weight part includes a first weight part (e.g., the first weight part W1 in the embodiment) and a second weight part (e.g., the second weight part W2 in the embodiment), at least one of the first weight part and the second weight part includes the drive unit, the battery is provided below the vehicle interior, the first weight part is provided in the front room, the second weight part is provided below the luggage room, and a height (e.g., a height H2 in the embodiment) of the second weight part is lower than a height (e.g., a height H1 in the embodiment) of the first weight part.

According to a second aspect, in the vehicle of the first aspect, the vehicle is a fuel cell vehicle, the first weight part includes an electric motor (e.g., a motor MOT in the embodiment), an energization control device (e.g., an inverter IVT in the embodiment) which performs energization control on the electric motor, and a fuel cell (e.g., a fuel cell FC in the embodiment), and the second weight part includes a hydrogen tank (e.g., a second hydrogen tank HT2 in the embodiment).

According to a third aspect, in the vehicle of the first aspect, the vehicle is a hybrid vehicle, the first weight part includes an engine (e.g., an engine ENG in the embodiment), an electric motor (e.g., the motor MOT in the embodiment), an electric generator (e.g., a generator GEN in the embodiment), and an energization control device (e.g., the inverter IVT in the embodiment) which performs energization control on the electric motor and the electric generator, and the second weight part includes a fuel tank (e.g., a fuel tank FT in the embodiment).

According to a fourth aspect, in the vehicle of the third aspect, the second weight part further includes a charger (e.g., a charger CHG in the embodiment).

According to a fifth aspect, in the vehicle of the first aspect, the vehicle is an electric vehicle, the first weight part includes an electric motor (e.g., the motor MOT in the embodiment), an energization control device (e.g., in the embodiment) which performs energization control on the electric motor, and a charger (e.g., the inverter IVT in the embodiment), and the second weight part includes another battery (e.g., a battery module 35 in the embodiment).

According to a sixth aspect, in the vehicle of the first to fifth aspects, the battery forms a battery unit (e.g., the battery unit 10 in the embodiment) which is configured to include a plurality of battery modules (e.g., battery modules 31 to 33 in the embodiment), and the battery module is disposed below a front seat (e.g., a front seat 4 in the embodiment) and below a rear seat (e.g., a rear seat 5 in the embodiment), but not disposed below feet of a crew member seated on the rear seat.

According to a seventh aspect, in the vehicle of the first to sixth aspects, the second weight part is fixed to a frame member (e.g., a sub frame 23 in the embodiment), and the frame member is fixed to a pair of left and right vehicle skeleton members (e.g., a floor frame 12 in the embodiment) which extend in a longitudinal direction.

According to an eighth aspect, in the vehicle of the first to seventh aspects, a height (e.g., a height H3 in the embodiment) of the battery is highest under the rear seat, and lower e height of the second weight part.

According to a ninth aspect, in the vehicle of the second aspect, the battery provided below the vehicle interior is disposed below a front seat (e.g., the front seat 4 in the embodiment), another hydrogen tank (e.g., a first hydrogen tank HT1 in the embodiment) is provided below a rear seat (e.g., a rear seat 5 in the embodiment), and a height (e.g., a height H4 in the embodiment) of the another hydrogen tank is lower than the height of the second weight part.

Advantage of the Invention

According to the first aspect, the first weight part (one of two weight parts) is disposed in the front room on the front side of the vehicle interior, and the second weight part (the other weight part) is disposed below the luggage room on the rear side of the vehicle interior with respect to the battery disposed below the vehicle interior. Therefore, it is possible to retain a weight balance of the vehicle, and the agility of the vehicle can be secured.

In addition, the height of the second weight part disposed below the luggage room is lower than the height of the first weight part disposed in the front room. Therefore, it is possible to suppress a height of the floor of the luggage room, and to secure space in the luggage room.

Further, the battery is disposed below the vehicle interior, and the second weight part is disposed below the luggage room. Therefore, it is possible to lower the height of a gravity center of the vehicle, and to improve drive performance of the vehicle.

According to the second to fifth aspects, in any one of the fuel cell vehicle, the hybrid vehicle, and the electric vehicle, it is possible to improve the agility and the drive performance of the vehicle while securing space in the luggage room.

According to the sixth aspect, since the battery module is not disposed at feet of the crew member seated on the rear seat, it is possible to suppress an influence on the vehicle interior, and it is possible to improve comport of the crew member. In addition, with such a configuration, it is possible to lower the height of the vehicle.

According to the seventh aspect, since the second weight part is fixed to the frame member which is fixed to the pair of left and right vehicle skeleton members, it is possible to use the common frame member regardless of a type of the second weight part, and it is possible to share a platform of the vehicle.

According to the eighth aspect, in general, the rear seat is disposed at a position higher than the front seat, so that the floor can be set low by making the height of the battery highest under the rear seat in accordance with the arrangement. Further, it is possible to improve comport of the crew member seated on the rear seat by making the height of the battery lower than the height of the second weight part.

According to the ninth aspect, in general, the rear seat is disposed at a position higher than the front seat, so that it is possible to set the floor low by disposing the other hydrogen tank in accordance with the arrangement. Further, it is possible to improve comport of the crew member seated on the rear seat.

MODE FOR CARRYING OUT THE INVENTION

Hereinafter, vehicles according to embodiments of the invention will be described based on the accompanying drawings.

<First embodiment>

Figure 1:
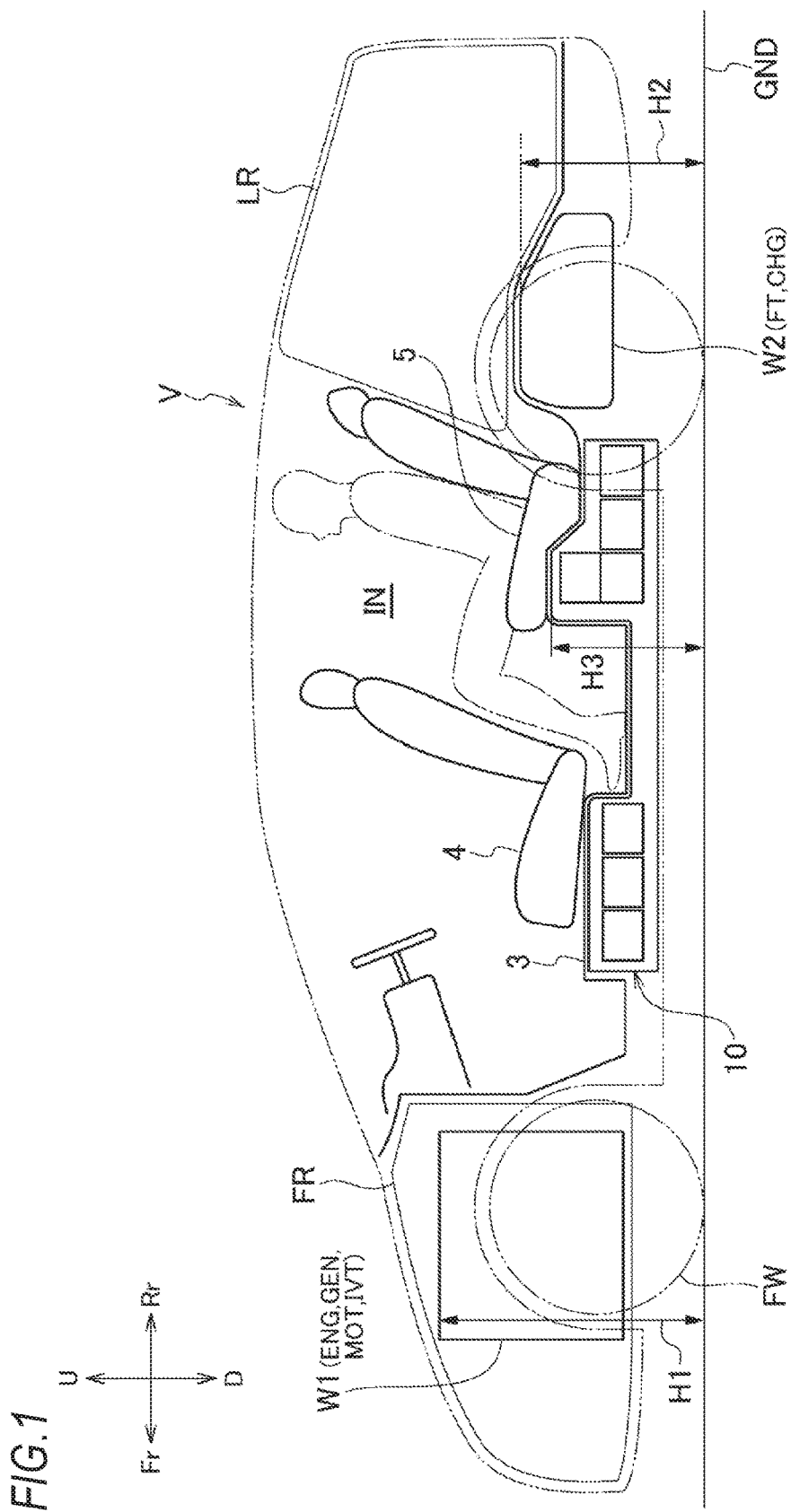
FIG. 1 is a diagram schematically illustrating a hybrid vehicle according to a first embodiment of a vehicle of the invention.

As illustrated in FIG. 1, a vehicle V of a first embodiment of the invention is a hybrid vehicle including a vehicle interior IN which is provided with a front seat 4 and a rear seat 5, a front room FR which is provided as a separate space from the vehicle interior IN on the front side of the vehicle interior IN, and a luggage room LR which is provided as the same space as the vehicle interior IN on the rear side of the vehicle interior IN. Further, the luggage room LR may be provided as a separate space from the vehicle interior IN, or may partially communicate with the vehicle interior.

Figure 5:
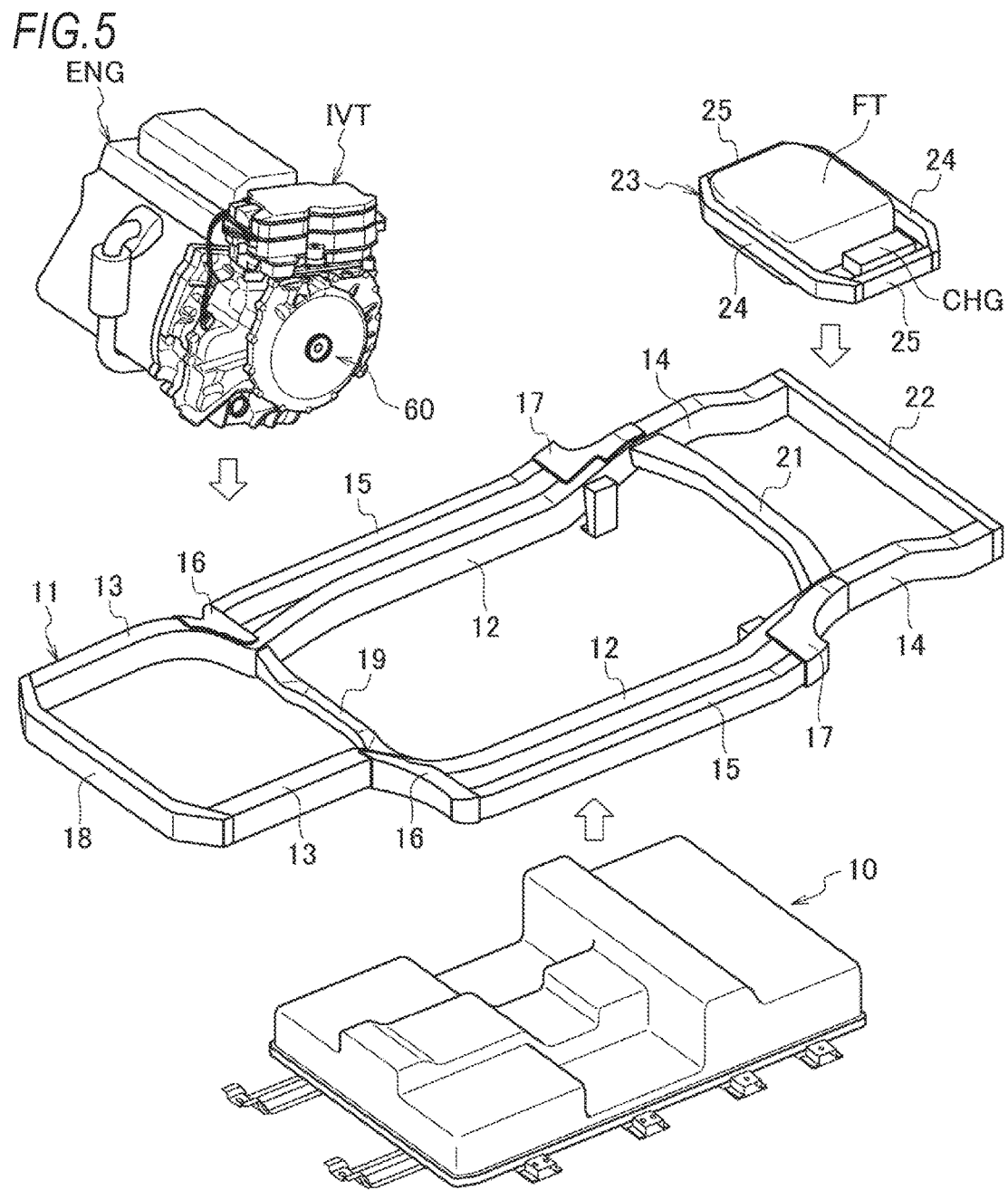
FIG. 5 is a view schematically illustrating the first weight part, a battery, and the second weight part which are mounted in a vehicle body frame in the hybrid vehicle of FIG. 1.
Figure 6:
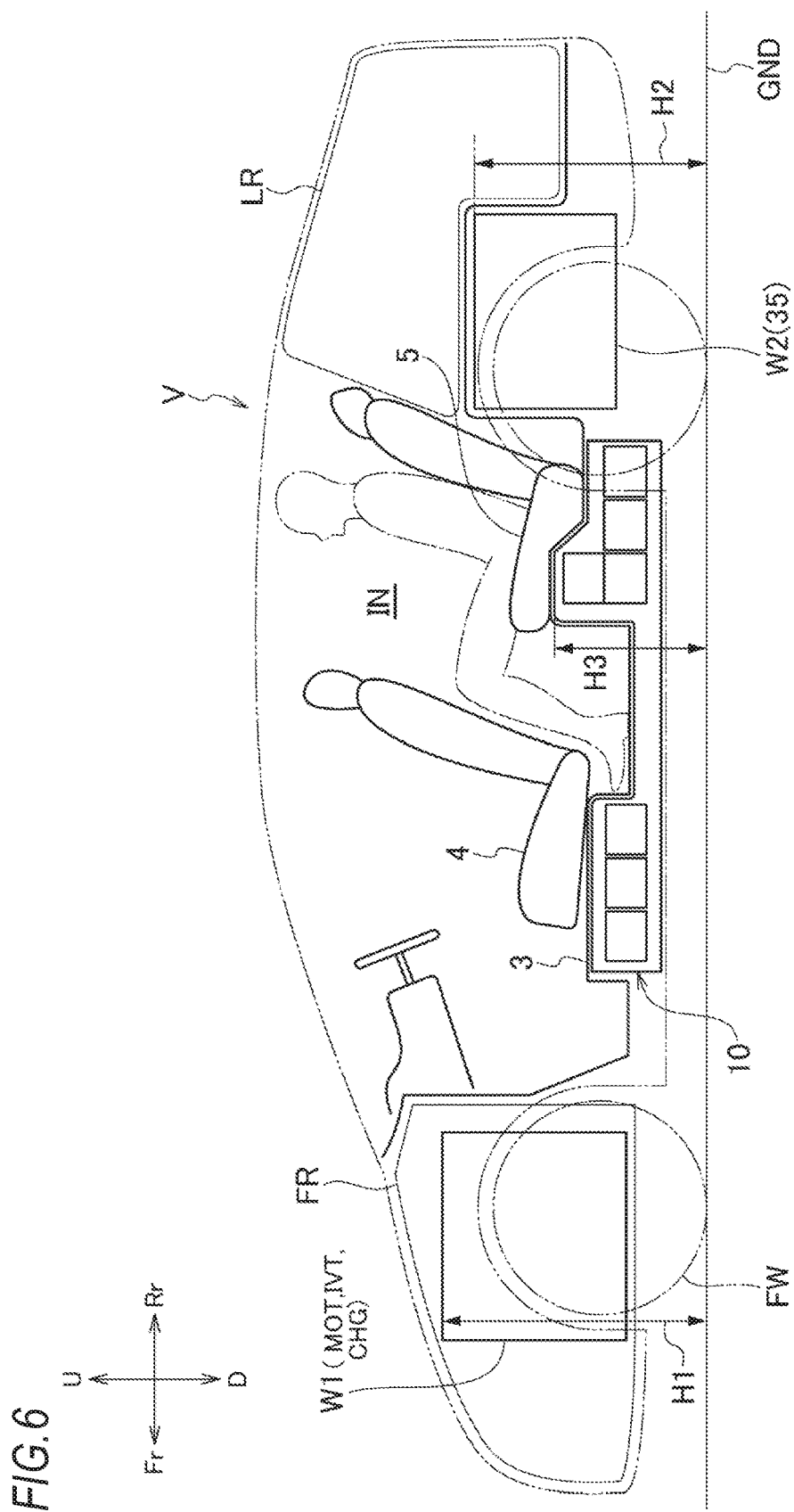
FIG. 6 is a view schematically illustrating an electric vehicle according to a second embodiment of the vehicle of the invention.
Figure 7:
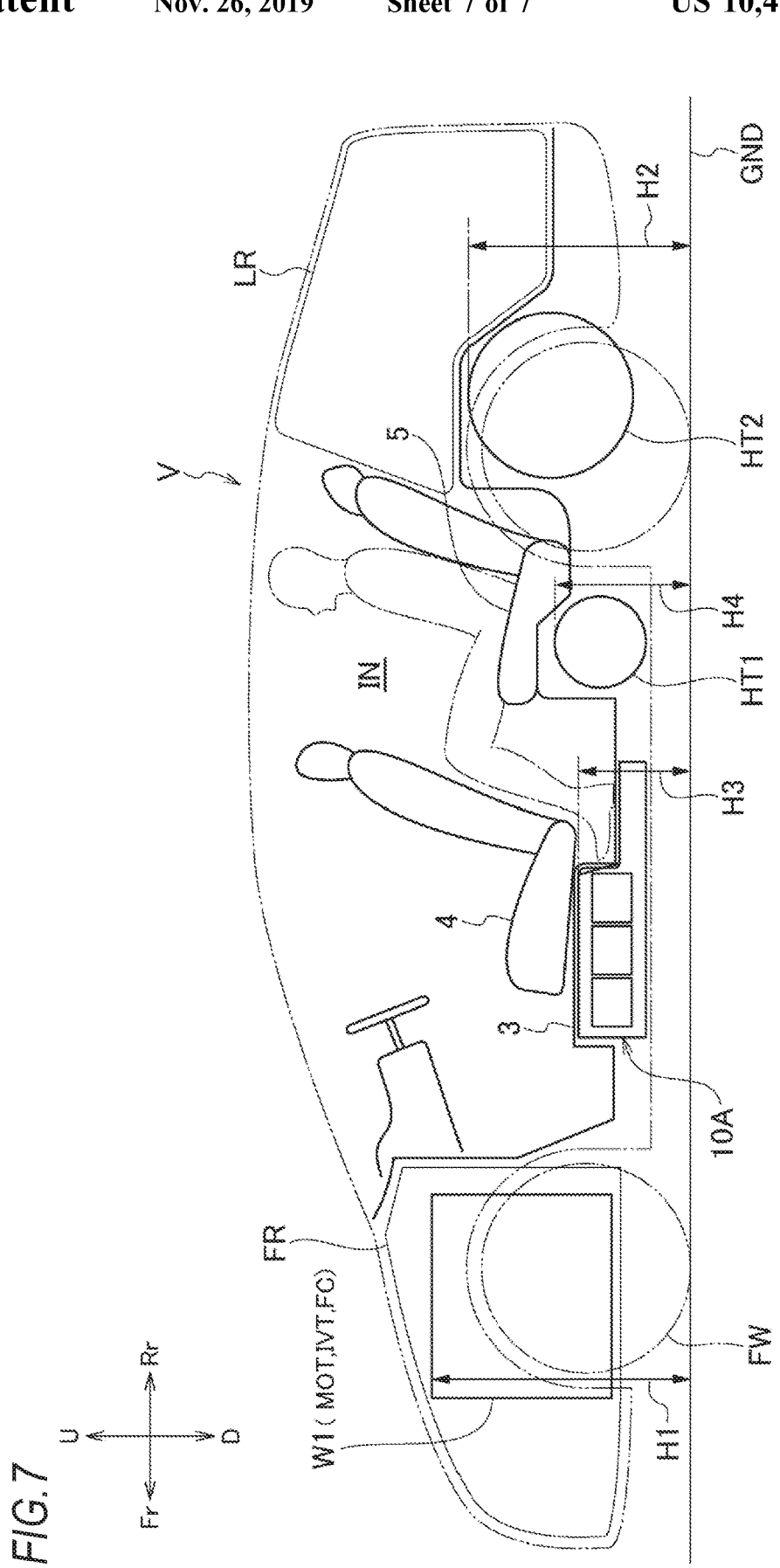
FIG. 7 is a view schematically illustrating a fuel cell vehicle according to a third embodiment of the vehicle of the invention.

As illustrated in FIG. 5, a vehicle body frame 11 includes a pair of left and right floor frames 12, 12 which extend in a longitudinal direction of a vehicle body, a pair of left and right front side frames 13, 13 which extend forward while being bent upward from front ends of the floor frames 12, 12, a pair of left and right rear side frames 14, 14 which extend rearward while being bent upward from rear ends of the floor frames 12, 12, a pair of left and right side frames 15, 15 which are disposed outside the floor frames 12, 12 in a vehicle width direction, a pair of left and right front outriggers 16, 16 which connect the front ends of the side frames 15, 15 to the front ends of the floor frames 12, 12, a pair of left and right rear outriggers 17, 17 which connect the rear ends of the side frames 15, 15 to the rear ends of the floor frames 12, 12, a front bumper beam 18 which connects the front ends of the pair of left and right front side frames 13, 13 in the vehicle width direction, a front cross member 19 which connects the front ends of the pair of left and right floor frames 12, 12 in the vehicle width direction, a rear cross member 21 which connects the intermediate portions in the longitudinal direction of the pair of left and right rear side frames 14, 14 in the vehicle width direction, and a rear bumper beam 22 which connects the rear ends of the pair of left and right rear side frames 14, 14 in the vehicle width direction.

In plan view, a space surrounded by the front side frames 13, 13, the front bumper beam 18, and the front cross member 19 corresponds to the front room FR a space surrounded by the side frames 15, 15, the front cross member 19, and the rear cross member 21 corresponds to the vehicle interior IN, and a space surrounded by the rear side frames 14, 14, the rear cross member 21, and the rear bumper beam 22 corresponds to the luggage room LR. A space surrounded by the side frames 15, 15, the front cross member 19, and the rear bumper beam 22 where the vehicle interior IN and the luggage room LR are partitioned is provided with a floor panel 3 which forms a floor of the vehicle interior IN and a floor of the luggage room LR.

In the vehicle V, a battery unit 10 is disposed on the lower side of the floor panel 3 which forms the floor of the vehicle interior IN, and two weight parts are disposed in a distributed manner with the battery unit 10 interposed therebetween so as to retain a weight balance of the vehicle. Specifically, a first weight part W1 of the two weight parts is provided in the front room FR and the other one, a second weight part W2, is disposed below the luggage room LR.

[Battery unit]

Figure 2:
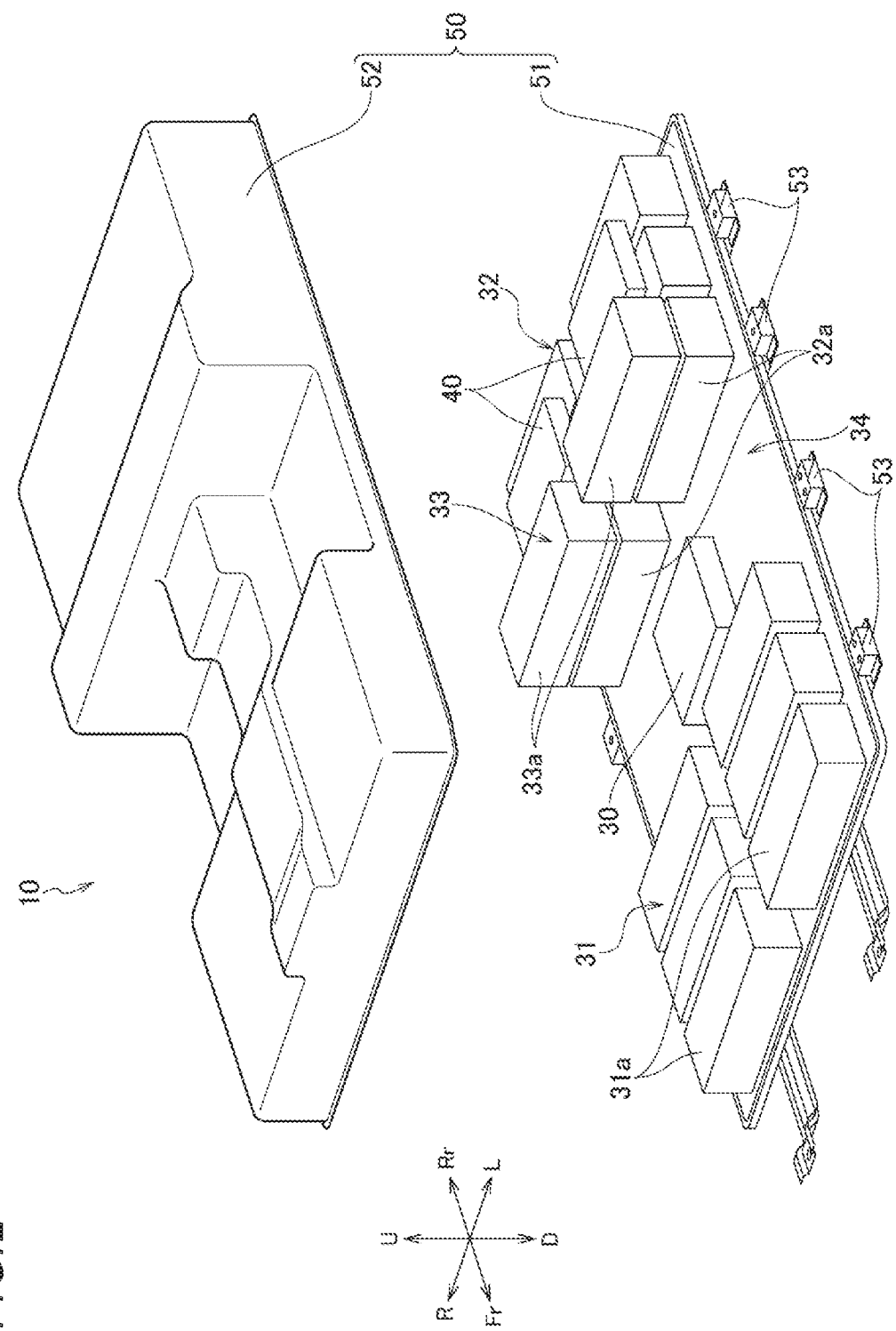
FIG. 2 is an exploded perspective view of a battery unit which is provided below a vehicle interior of the hybrid vehicle of FIG. 1.

As illustrated in FIGS. 1 and 2, the battery unit 10 disposed on the lower side of the floor panel 3 Which forms the floor of the vehicle interior IN mainly includes a plurality of battery modules 31 to 33, a DC-DC converter 30, a battery ECU 40, and a battery case 50 which stores these components.

The battery case 50 is configured to include a bottom plate 51 on which the plurality of battery modules 31 to 33, the DC-DC converter 30, and the battery ECU 40 are mounted, and a cover 52 which covers these components from the upper side. A plurality of brackets 53 which are formed as parts of the bottom plate 51 and extend in the transverse direction are fastened to the floor frame 12, 12 disposed on both sides of the vehicle V, and thus the battery case 50 is attached such that the battery unit 10 is suspended on the lower side of the floor panel 3.

In the plurality of battery modules 31 to 33, the front battery module 31 stored in the front portion of the battery case 50, two rear battery modules 32, 33 stored in the rear portion of the battery case 50 with a space 34 interposed are included. The battery modules 31 to 33 include a plurality of high-voltage batteries 31a to 33a respectively. In this embodiment, total six high-voltage batteries 31a (two in the transverse direction and three in the longitudinal direction) are arranged to form the front battery module 31, total six high-voltage batteries 32a (two in the transverse direction and three in the longitudinal direction) are similarly arranged to form one rear battery module 32 (hereinafter, referred to as a lower rear battery module 32), two high-voltage batteries 33a are arranged in the transverse direction to form the other rear battery module 33 (hereinafter, referred to as an upper rear battery module 33).

The plurality of battery modules 31 to 33 are disposed on the lower side of the front seat 4 and the rear seat 5 of the vehicle V (see FIG. 1). Specifically, the front battery module 31 is disposed on the lower side of the front seat 4, and the lower rear battery module 32 and the upper rear battery module 33 are disposed on the lower side of the rear seat 5.

The front battery module 31 is disposed on the lower side of the front seat 4 in a flat way without being overlapped. The lower rear battery module 32 and the upper rear battery module 33 are disposed on the lower side of the rear seal 5 to be vertically on the front side of the seat surface of the rear seat 5. Specifically, two high-voltage batteries 33a forming the upper rear battery module 33 are disposed above two high-voltage batteries 32a arranged on the foremost side among six high-voltage batteries 32a forming the lower rear battery module 32. The space 34 is positioned at the feet of a crew member seated on the rear seat 5, and the battery modules 31 to 33 are not disposed at the feet of the crew member seated on the rear seat 5. Therefore, it is possible to suppress an influence on the vehicle interior, and to improve comfort of the crew member. In addition, with such a configuration, it is possible to lower the height of the vehicle.

The DC-DC converter 30 is a high-voltage machine which transforms a DC current, and is disposed in the space 34 between the front battery module 31 and the rear battery modules 32, 33 and at the center in the vehicle width direction of the battery unit 10. In addition, the battery ECU 40 is a battery controller which manages charging/discharging and temperatures of the high-voltage batteries 31a to 33a, and is disposed on the rear side of the upper rear battery module 33 and on the upper side of the lower rear battery module 32.

[First weight part]

Figure 3:
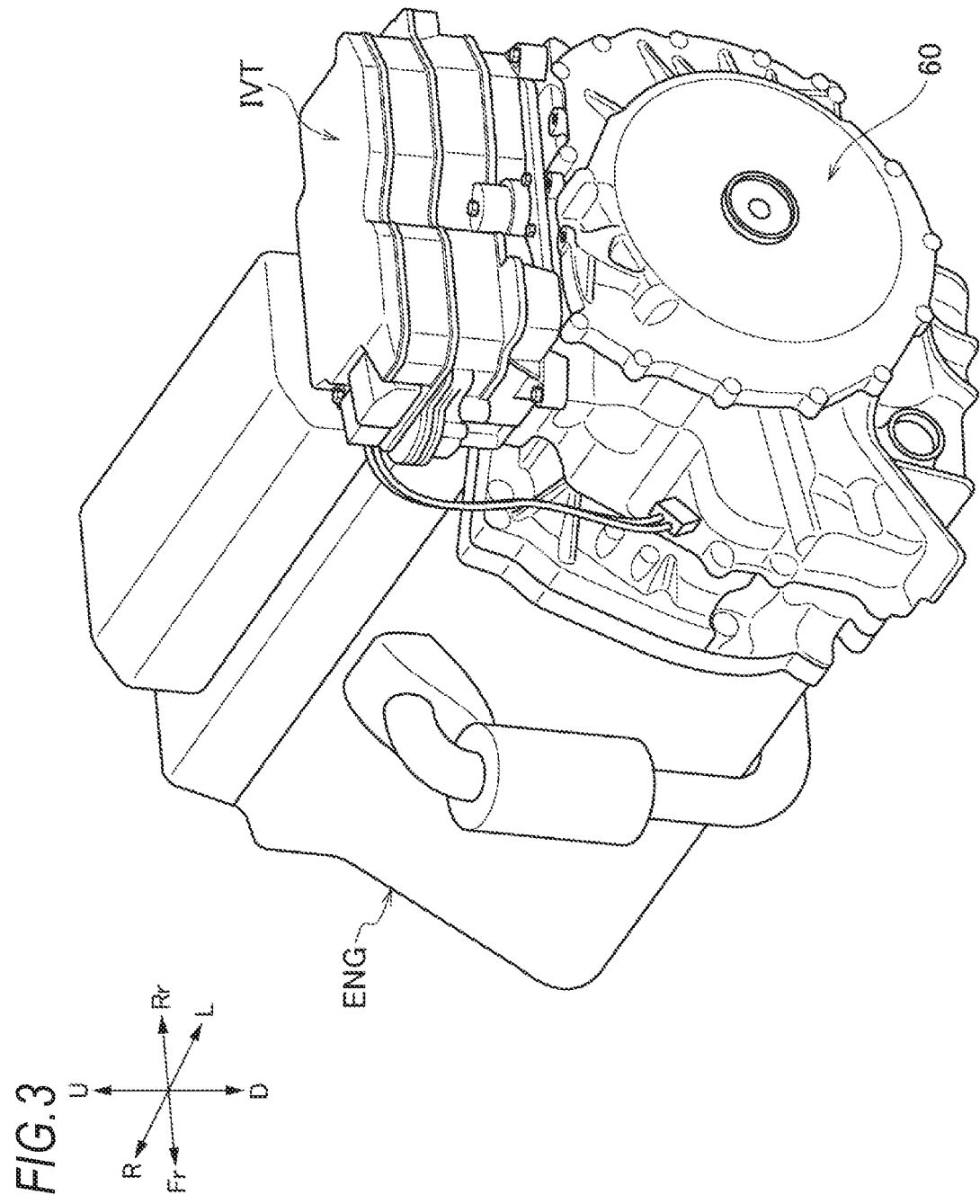
FIG. 3 is a perspective view of a first weight part provided in a front room in the hybrid vehicle of FIG. 1.
Figure 4:
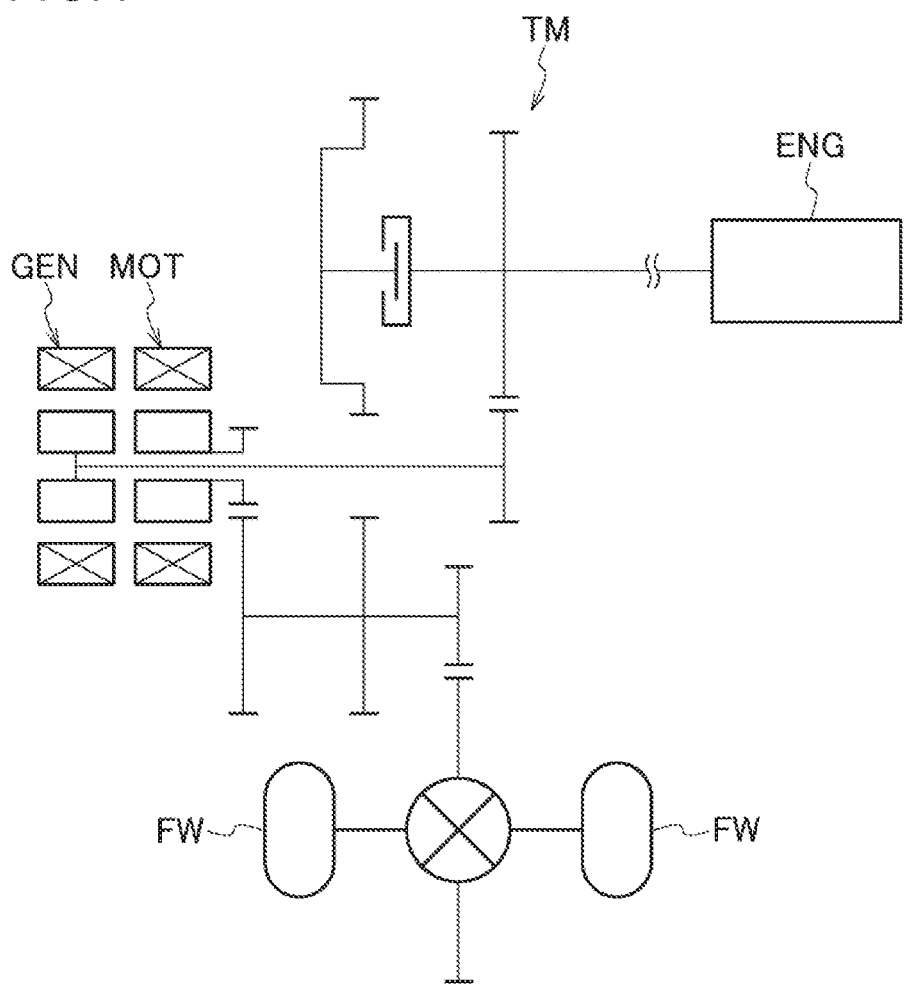
FIG. 4 is a block diagram of the first weight part of FIG. 3.

As illustrated in FIGS. 3 and 4, the first weight part W1 provided in the front room FR includes an engine ENG, a generator GEN, a motor MOT, and an inverter IVT which controls the generator GEN and the motor MOT. The generator GEN and the motor MOT are stored in a driving device case 60 and disposed to be adjacent to the engine ENG, and the inverter IVT is disposed on the driving device case 60.

The driving device case 60 is further provided with a transmission TM therein. The transmission TM includes a transmission path through which a driving force of the motor MOT is transferred to the front wheels FW, FW to cause the vehicle to run, and a transmission path through which a driving force of the engine ENG is transferred to the front wheels FW, FW to cause the vehicle to run. The vehicle can run using these two transmission paths by selecting in an alternative manner or used jointly.

The inverter IVT is connected between the plurality of battery modules 31 to 33 and the generator GEN and the motor MOT, and converts a DC voltage into an AC voltage or an AC voltage to a DC voltage. In the bottom surface of the inverter IVT, there are provided an inverter-side generator connector and an inverter-side motor connector. These inverter-side generator connector and inverter-side motor connector are electrically connected to a case-side generator connector and a case-side motor connector which are provided in the upper surface of the driving device case 60, so that the generator GEN and the motor MOT can be controlled by the inverter IVT.

[Second weight part]

The second weight part W2 provided in the luggage room LR includes a fuel tank FT which supplies fuel such as gasoline and natural gas to the engine ENG and a charger CHG which charges the plurality of battery modules 31 to 33 using power supplied from an external power source, and is held in a sub frame 23 such that the fuel tank FT and the charger CHG are adjacent in the vehicle width direction.

The sub frame 23 is configured such that a pair of front and rear sub cross frames 24, 24 extending in the traverse direction and a pair of left and right sub side frames 25, 25 extending in the longitudinal direction are connected in a substantial rectangular shape. The sub frame is fastened to the rear side frames 14, 14 in a state where the fuel tank FT and the charger CHG are stored therein.

[Relative position relation]

Making an explanation on a relative position relation between the first weight part W1 and the second weight part W2, the first weight part W1 and the second weight part W2 are disposed on the front and rear sides with the battery unit 10 interposed therebetween, and a height H2 of the second weight part W2 is lower than a height H1 of the first weight part W1 with a ground surface GND as a reference. In other words, in this embodiment, the height H2 of the uppermost surface of the fuel tank FT and the charger CHG in the second weight part W2 is configured to be lower than the height H1 of the uppermost surface of the engine ENG, the generator GEN, the motor MOT, and the inverter IVT in the first weight part W1. With such a configuration, it is possible to suppress the height of the floor of the luggage room LR to be low, and the space of the luggage root LR can be secured.

In addition, a height H3 of the battery unit 10 is highest under the rear seat 5, and is lower than the height H2 of the second weight part W2. In general, the rear seat 5 is disposed at a position higher than the front seat 4, so that the floor can be set low by making the height of the battery unit 10 highest under the rear seat 5. Further, it is possible to secure space at the top of the crew member seated on the rear seat 5 and to improve comport by making the height H3 of the battery unit 10 lower than the height of the second weight part W2.

In addition, it is possible to set the height of a gravity center of the vehicle V to be low and to improve driving performance of the vehicle V by disposing the battery unit 10 below the vehicle interior IN and by disposing the second weight part W2 below the luggage room LR.

<Second embodiment>

Next, a vehicle V of a second embodiment of the invention will be described. Further, the vehicle V of the second embodiment is different from that of the first embodiment in that only the components of the first weight part W1 and the second weight part W2 are different, and thus the same components are assigned with the same symbols and the description thereof will be omitted.

The vehicle V of the second embodiment of the invention is an electric vehicle, in which the battery unit 10 is disposed on the lower side of the floor panel 3 forming the floor of the vehicle interior IN, and two weight parts are disposed in a distributed manner with the battery unit 10 interposed therebetween so as to retain the weight balance of the vehicle. One first weight part W1 of two weight parts is provided in the front room FR and the other second weight part W2 is disposed below the luggage room LR, which is the same as the first embodiment.

[First weight part]

The first weight part W1 provided in the front room FR includes the motor MOT, the inverter IVT which controls the motor MOT, and the charger CHG which charges the plurality of battery modules 31 to 33 using power supplied from the external power source.

[Second weight part]

The second weight part W2 provided in the luggage room includes a battery module 35 in addition to the plurality of battery modules 31 to 33 which are stored in the battery unit 10, and the battery module 35 is held to the sub frame 23 which is fastened to the rear side frames 14, 14.

[Relative position relation]

Making an explanation on a relative position relation between the first weight part W1 and the second weight part W2, the first weight part W1 and the second weight part W2 are disposed on the front and rear sides with the battery unit 10 interposed therebetween, and the height H2 of the second weight part W2 is lower than the height H1 of the first weight part W1 with the ground surface GND as a reference. In other words, in this embodiment, the height H2 of the uppermost surface of the battery module 35 forming the second weight part W2 is configured to be lower than the height H1 of the uppermost surface of the motor MOT, the inverter IVT, and the charger CHG forming the first weight part W1. With such a configuration, even in the electric vehicle of the second embodiment, it is possible to suppress the height of the floor of the luggage room LR to be low, and to secure space for the luggage room LR similarly to the hybrid vehicle of the first embodiment. In addition, it is possible to set the height of the gravity center of the vehicle V to be low, and to improve driving performance of the vehicle V.

In addition, a height H3 of the battery unit 10 is highest under the rear seat 5, and is lower than the height H2 of the second weight part W2. With this configuration, even in the electric vehicle of the second embodiment, it is possible to set the floor to be low, and it is possible to secure space at the top of the crew member seated on the rear seat 5 similarly to the hybrid vehicle of the first embodiment. Therefore, it is possible to improve comport.

<Third Embodiment>

Hereinafter, a vehicle V of a third embodiment of the invention will be described. Further, the vehicle V of the third embodiment is different from the first and second embodiments only in the configuration below the vehicle interior IN and the components forming the first weight part W1 and the second weight part W2, and the same components will be assigned with the same symbols and the description thereof will be omitted.

The vehicle V of the third embodiment of the invention is a fuel cell vehicle includes a fuel cell FC which generates power by an electrochemical reaction between oxygen and nitrogen, and two first and second hydrogen tanks HT1 and HT2 which store pressurized hydrogen. A battery unit 10A smaller than the battery unit 10 of the first and second embodiments and the first hydrogen tank HT1 are disposed on the lower side of the floor panel 3 forming the floor of the vehicle interior N. Two weight parts are disposed in a distributed manner with the battery unit 10A and the first hydrogen tank HT1 interposed therebetween, so that the weight balance of the vehicle is secured. Similarly to the first and second embodiments, one first weight part W1 of two weight parts is provided in the front room FR, and the other second weight part W2 is disposed below the luggage room LR.

The battery unit 10A is disposed on the lower side of the front seat 4, the first hydrogen tank HT1 is disposed on the lower side of the rear seat 5, and the battery unit 10A and the first hydrogen tank HT1 are not disposed at the feet of the crew member seated on the rear seat 5. Therefore, it is possible to suppress an influence on the vehicle interior, and to improve comport of the crew member. In addition, the first hydrogen tank HT1 is smaller than the second hydrogen tank HT2 to be described below, and the height of the rear seat 5 is suppressed. With these configurations, it is possible to set the vehicle height to be low.

[First weight part]

The first weight part W1 provided in the front room FR includes the motor MOT, the inverter IVT which controls the motor MOT, and the fuel cell FC.

[Second weight part]

The second weight part W2 provided in the luggage room LR includes the second hydrogen tank HT2, and is held in the sub frame 23 in which the second hydrogen tank HT2 is fastened to the rear side frames 14, 14.

[Relative position relation]

Making an explanation on a relative position relation between the first weight part W1 and the second weight part W2, the first weight part W1 and the second weight part W2 are disposed on the front and rear sides with the battery unit 100 and the first hydrogen tank HT1 interposed therebetween, and the height H2 of the second weight part W2 is lower than the height H1 of the first weight part W1 with the ground surface GND as a reference. In other words, in this embodiment, the height H2 of the uppermost surface of the second hydrogen tank HT2 forming the second weight part W2 is configured to be lower than the height H1 of the uppermost surface of the motor MOT, the inverter IVT, and the fuel cell FC forming the first weight part W1. With such a configuration, even in the fuel cell vehicle of the third embodiment, it is possible to suppress the height of the floor of the luggage room LR to be low, and it is possible to secure space for the luggage room LR similarly to the hybrid vehicle of the first embodiment and the electric vehicle of the second embodiment.

In addition, in the battery unit 10A disposed on the lower side of the floor panel 3 forming the floor of the vehicle interior IN and the first hydrogen tank HT1, the height H3 of the battery unit 10A is lower than a height H4 of the first hydrogen tank HT1, the battery unit 10A having a relatively low height is disposed below the front seat 4, and the first hydrogen tank HT1 having a relatively high height is disposed below the rear seat 5. In general, the rear seat 5 is disposed at a position higher than the front seat 4, so that the floor can be set low by disposing the first hydrogen tank HT1 having a relatively high height below the rear seat 5 in accordance with the arrangement.

Further, the height H4 of the first hydrogen tank HT1 is configured to be lower than the height of the second weight part W2. In this way, it is possible to secure space at the top of the crew member seated on the rear seat 5 and to improved comport by setting the height H4 of the first hydrogen tank HT1 to be lower than the height of the second weight part W2.

Hitherto, the description has been given about the embodiments of the invention, and the invention may include various changes in design within a scope not departing from the spirit.

For example, the hybrid vehicle of the first embodiment has been described such that the fuel tank FT and the charger CHG are disposed in the second weight part W2, but the charger CHG may be not necessary and a configuration in which the charging is not performed by an external charger may be applied. In addition, the battery may be not formed in units such as the DC-DC converter 30 and the battery ECU 40. As the battery, a secondary battery such as a lithium ion battery and a nickel hydrogen battery may be used.

DESCRIPTION OF REFERENCE NUMERALS AND CHARACTERS 4 front seat
5 rear seat
10 battery unit (battery)
12 floor frame (vehicle skeleton member)
23 sub frame (frame member)
31 to 33 battery module
35 battery module (another battery)
CHG charger
ENG engine
FC fuel cell
FR front room
FT fuel tank
FW front wheel (vehicle wheel)
GEN generator (electric generator)
H1 height of first weight part
H2 height of second weight part
H3 height of battery unit (height of battery)
H4 height of first hydrogen tank (height of another hydrogen tank)
HT2 second hydrogen tank (hydrogen tank)
IN vehicle interior
IVT inverter (energization control device)
LR luggage room
MOT motor (electric motor)
V vehicle
W1 first weight part (weight part)
W2 second weight part (weight part)

The invention claimed is:

1. A vehicle comprising:
a vehicle interior in which a rear seat is provided;
a front room which is provided as a separate space from the vehicle interior on a front side of the vehicle interior;
a luggage room which is provided as a same space as the vehicle interior or a separate space from the vehicle interior in a rear side of the vehicle interior;
a weight part which includes at least one of a drive unit to drive a vehicle wheel and a power source to supply fuel or power to the drive unit; and
a battery which supplies power to the drive unit, wherein
the weight part includes a first weight part and a second weight part,
at least one of the first weight part and the second weight part includes the drive unit,
the battery includes a plurality of battery modules and is provided below the vehicle interior,
at least a part of the plurality of battery modules of the battery is disposed under the rear seat, in the at least a part of the plurality of battery modules, a height of a rear part under the rear seat is lower than a height of a front part under the rear seat, a battery controller is disposed on a rear side of battery modules of the plurality of battery modules disposed in the front part under the rear seat and on an upper side of battery modules of the plurality of battery modules disposed in the rear part under the rear seat, the first weight part is provided in the front room, the second weight part is provided below the luggage room, and a height of the second weight part is lower than a height of the first weight part.

2. The vehicle according to claim 1, wherein the vehicle is a hybrid vehicle, the first weight part includes an engine, an electric motor, an electric generator, and an energization control device which performs energization control on the electric motor and the electric generator, and the second weight part includes a fuel tank.

3. The vehicle according to claim 2, wherein the plurality of battery modules are disposed below a front seat and below the rear seat, but not disposed below a floor portion that is positioned in a rear side of the front seat and in a front side of the rear seat.

4. The vehicle according to claim 2, wherein the second weight part is fixed to a frame member, and the frame member is fixed to a pair of left and right vehicle skeleton members which extend in a longitudinal direction.

5. The vehicle according to claim 2, wherein a height of the battery is highest under the rear seat, and lower than the height of the second weight part.

6. The vehicle according to claim 2, wherein the second weight part further includes a charger.

7. The vehicle according to claim 6, wherein the plurality of battery modules are disposed below a front seat and below the rear seat, but not disposed below a floor portion that is positioned in a rear side of the front seat and in a front side of the rear seat.

8. The vehicle according to claim 1, wherein the vehicle is an electric vehicle, the first weight part includes an electric motor, an energization control device which performs energization control on the electric motor, and a charger, and the second weight part includes another battery.

9. The vehicle according to claim 8, wherein the plurality of battery modules are disposed below a front seat and below the rear seat, but not disposed below a floor portion that is positioned in a rear side of the front seat and in a front side of the rear seat.

10. The vehicle according to claim 8, wherein the second weight part is fixed to a frame member, and the frame member is fixed to a pair of left and right vehicle skeleton members which extend in a longitudinal direction.

11. The vehicle according to claim 8, wherein a height of the battery is highest under the rear seat, and lower than the height of the second weight part.

12. The vehicle according to claim 1, wherein the plurality of battery modules are disposed below a front seat and below the rear seat, but not disposed below a floor portion that is positioned in a rear side of the front seat and in a front side of the rear seat.

13. The vehicle according to claim 1, wherein the second weight part is fixed to a frame member, and the frame member is fixed to a pair of left and right vehicle skeleton members which extend in a longitudinal direction.

14. The vehicle according to claim 1, wherein a height of the battery is highest under the rear seat, and lower than the height of the second weight part.

* * * * *